Patented May 21, 1946

2,400,532

UNITED STATES PATENT OFFICE 2,400,532

PHOTOGRAPHIC ELEMENT

Ralph Kingsley Blake, Parlin, and Walter Dewey Baldsiefen, Metuchen, N. J., assignors to E. I. du Pont de Nemours & Company, Wilmington, Del., a corporation of Delaware No Drawing. Application April 20, 1944, Serial No. 531,978

14 Claims. (Cl. 95—7)

This invention relates to photography and more particularly to radiation sensitive photogrophic elements. Still more particularly it relates to photographic silver halide layers of photographic elements which have in operative association therewith a hydrotropic agent and an oxyalkylene ether of a hexitol ring dehydration product.

This invention has for an object the provision of improved photographic elements. A further object is to improve the speed and contrast of photographic silver halide emulsion layers. Another object is to provide photographic silver halide emulsion layers of enhanced stability to aging. Still other objects will be apparent from the following description of the invention.

The above objects are attained and new and useful photographic emulsions and emulsion layers are obtained by bringing into contact with light-sensitive silver halides a hydrotropic agent and a polyoxyalkylene ether of a hexitol ring dehydration product. Such polyoxyalkylene ethers including hexitans and hexides which have at least one hydroxyl group replaced by a polyoxyalkylene radical and which may further contain at least one lipophilic radical taken from the group consisting of long chain aliphatic hydrocarbon radicals and long chain aliphatic monocarboxylic acid ester groups, e. g., of 8 to 18 or more carbon atoms.

The polyoxyalkylene ethers just described can be incorporated with the emulsion prior to coating or with the emulsion layer after coating. Thus, a silver halide emulsion may be impregnated with a solution containing the compounds. Alternatively, the polyoxyalkylene ethers can be placed in a sub-stratum coating or in an overcoating which is placed in intimate contact with the emulsion layer.

The hydrotropic agents may be added to the photographic silver halide emulsion or to the emulsion layer or to a separate layer in the same manner as described for the polyoxyalkylene ethers. It is preferable, however, to add the hydrotropic agent to the photographic emulsion after the photographic emulsion has been brought to its maximum sensitivity and prior to coating. The hydrotropic agents can advantageously be added from the aqueous solutions or from an organic solvent in the manners commonly employed for adding wetting agents to photographic emulsions. Similarly, the polyoxyalkylene ether compounds can be added in like manner.

The polyoxyalkylene ethers of hexitol ring dehydration products are commercially available. They can be made by reacting a hexitan or a hexide with an alkylene oxide such as ethylene oxide or propylene oxide in an amount sufficient to introduce a plurality of oxyalkylene groups into the molecule. For instance, the reaction may be carried out in a manner similar to that described in British Patent No. 443,559. In general, the alkylene oxide should be used in an amount sufficient to form an ether group on one of the oxygen atoms of the hydroxyl groups of the hexitan or hexide and introduce at least two of the alkylene groups (—R—O— wherein R is an alkylene radical, e. g., ethylene, propylene, butylene, etc.). The alkylene oxide may, however, react with several of the hydroxyl groups of the hexitans or hexides and introduce several oxyalkylene chains. For example, one to four of the hydroxyl groups of the hexitan or one to two of the hydroxyl groups of the hexide may react and form a chain or chains of oxyalkylene groups of 2 to 20 or more of such groups.

The resulting polyoxyalkylene ethers of the hexitans or hexides may then be reacted with a mono-functional etherification agent or esterification agent to introduce a lipophilic group, e. g., an aliphatic hydrocarbon chain of 8 to 18 or more carbon atoms or the hexitans or hexides may be first esterified or etherified with such agents and the resulting long chain ethers or esters later reacted with an alkylene oxide. Suitable long chain etherification or esterification reactants include normal alkyl halides of 8 to 20 carbon atoms, e. g., n-octylchloride, n-dodecyl bromide, n-tetradecylchloride, n-octadecyl bromide, and n-hexadecylbromide, or a fatty acid halide of 8 to 20 carbon atoms, e. g., octadecoylchloride, dodecoylchloride, tetradecoyl bromide, n-oleyl chloride, etc. The introduction of two oxyalkylene ether groups into the hexitan or hexide is enough to form the products used in accordance with this invention. It is possible that the alkyl halides or acid halides react with the hydroxyl group at the end of the oxyalkylene chain when etherification with alkylene oxides is effected first. However, if the hexitan or hexide is first esterified or etherified with a long chain mono-functional etherification or esterification agent, the lipophilic groups become linked to an acyclic oxygen atom thereof.

When hexitols are dehydrated, they generally result in a mixture of ring compounds, namely hexitans and hexides, which can be separated by fractional crystallization or extraction. For the purposes of this invention, the ring dehydration products need not be completely separated and mixtures of hexitans and hexides may be utilized to prepare the products used in accordance with this invention.

A class of especially useful products have a structure which is exemplified by the following hexitans and hexide derivative formulae:

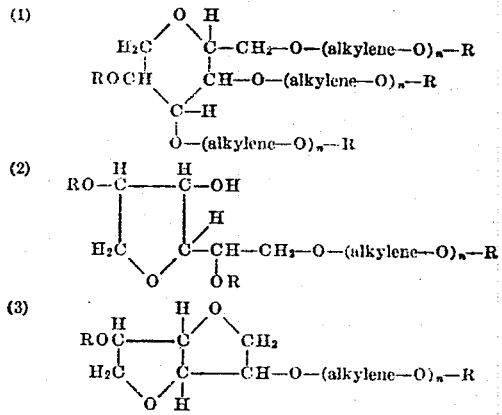

wherein in the formulae one of the R's is an alkyl radical of 8 to 20 carbon atoms or an acyl radical of the formula R—CO— wherein R has the same value and the other R's are hydrogen and $n$ is 2 to 20 or more.

In a preferred aspect of the invention saponin is used as the hydrotropic agent. It may be added to the silver halide emulsion, or to the coating solution for a sub-stratum or over-coating, from an aqueous solution or from an organic solvent. It has been found that especially good results can be obtained when water miscible alcohols and particularly ethanol are used in aqueous solution to dissolve the saponin. Substantial amounts of ethanol may be present in the resulting emulsion layers. Other useful solvents include methanol, acetone, ethylene glycol, dioxane and pyridine.

The compounds are especially effective with gelatino-silver-halide emulsion layers but may be used with any water-permeable binding agent for silver halides. The compounds moreover can be incorporated in light-insensitive materials, e. g., a water-permeable colloid such as gelatin hydrophilic polyvinyl alcohols, etc., and coated onto a silver halide layer or as sub-stratum coatings or as coatings on the face of the support removed from the emulsion layer.

The invention will be further illustrated but is not intended to be limited by the following examples.

Example 1

A gelatino-silver-halide emulsion containing about 6.8% silver iodide and 93.2% silver bromide was brought to its maximum light-sensitivity and prepared for coating and a small amount of saponin was added from aqueous solution. The following quantities of sorbitan derivatives per 0.15 mol of silver halide were added to the liquid emulsions, and the resulting emulsion was coated onto a cellulose nitrate film base to form a thin layer and dried. The film element was exposed in a IIB-sensitometer and then developed in a solution of the composition:

N-methyl-para-aminophenol sulfate _____ grams__ 0.8
Hydroquinone _____ do____ 1.0
Sodium sulfite (anhydrous) _____ do____ 90.0
Borax _____ do____ 3.0
Potassium bromide _____ do____ 0.1
Water to _____ liter__ 1 for 7 minutes at 68° F. with the results listed in the following table.

| Name of compound | Quantity | Relative speed | Gamma | Fog |
|---|---|---|---|---|
|  | *Ml.* |  |  |  |
| Control | | 348 | 0.77 | 0.05 |
| Mannitan monolaurate polyoxyalkylene ether | 0.1 | 373 | .81 | .05 |
| Do | 0.2 | 400 | .84 | .05 |
| Sorbitan monolaurate polyoxyalkylene ether—Containing 20 oxyalkylene groups divided in 3 chains | 0.1 | 373 | .79 | .05 |
| Do | 0.2 | 429 | .81 | .06 |
| Sorbitan monooleate polyoxyalkylene ether—Containing 20 oxyalkylene groups divided in 3 chains | 0.1 | 400 | .83 | .06 |
| Do | 0.2 | 429 | .80 | .06 |
| Do | 0.3 | 493 | .80 | .07 |
| Sorbitan monostearate polyoxyalkylene ether containing 20 oxyalkylene groups divided in 3 chains | 0.1 | 400 | .82 | .07 |

Example 2

A gelatino-silver-halide emulsion containing about 30% silver bromide and 70% silver chloride of the type used in the graphic arts was brought to its maximum light-sensitivity and prepared for coating and a small amount of saponin was added. The following quantities of hexitan ether derivatives, based on 0.15 mol of silver halide, were added from an aqueous solution and the resulting emulsion was coated onto a cellulose acetate film base and the coated element was dried. The film element was then exposed through a picture transparency and developed in a solution of the following type:

Sodium sulfite _____ grams__ 30
Paraformaldehyde _____ do____ 7.5
Potassium metabisulfite _____ do____ 2.5
Boric acid, crystals _____ do____ 7.5
Hydroquinone _____ do____ 22.5
Potassium bromide _____ do____ 1.5
Water to _____ liter__ 1 for 7 minutes at 68° F., fixed, washed and dried with the results given in the following table.

| Name of compound | Quantity | Effective contrast | Fog |
|---|---|---|---|
|  | *Ml.* |  |  |
| Sorbitan monolaurate polyoxyalkylene ether containing 20 oxyalkylene groups in 3 chains | 0.1 | 3.06 | .01 |
|  | 0.2 | 4.12 | .01 |
|  | 0.3 | 4.34 | .01 |
| Control | | 2.82 | .01 |

Example 3

A photographic film element comprising a cellulose nitrate film base bearing a gelatino-silver-iodide-bromide emulsion layer containing 6.8% of the former to 93.2% of the latter and a hydrotropic agent such as saponin was made. Two hundred and twenty grams of a gelatin in 8.58 liters of aqueous solution containing the amounts of a sorbitan ether ester given in the accompanying table was coated onto the silver halide layer to form a layer. It was exposed and processed after the manner described in Example 1 with the following results:

| Name of compound | Quantity | Relative speed | Gamma | Fog |
|---|---|---|---|---|
|  | *Ml.* |  |  |  |
| Control | | 283 | 0.67 | .06 |
| Sorbitan monolaurate polyoxyalkylene ether | 10 | 325 | 0.66 | .09 |
| Containing 20 oxyalkylene groups in 3 chains | 20 | 348 | 0.69 | .07 |

Example 4

Photographic elements of the type set forth in Example 1 but containing the compounds listed in the following table were made. The respective films were divided into three examples, the first of which was exposed in a II-B sensitometer and then developed in the dark in a solution of the type given in Example 1, fixed with an acid-hardening fixing bath, washed and dried and its speed determined from the density of the developed silver. A second sample was exposed in a II-B sensitometer and developed in like manner after 1 week aging at 75° F., fixed, washed and dried. A third sample was heated in an oven at a temperature of 120° F. for 144 hours and then exposed, developed and fixed in like manner. A single control element containing the same emulsion but free from the compounds was made and tested in like manner with the results given in the following table.

acid, polyvinyl alcohol, and partially hydrolyzed polyvinyl acetate and interpolymers thereof with unsaturated materials such as styrene, maleic acid, etc., water-soluble polyvinyl acetals and other hydrophilic synthetic or natural resins and polymeric compounds. Suitable hydrophilic colloids of the above type are described in United States Patents 2,110,491, 2,276,322, 2,276,323, 2,286,215 and 2,211,323.

The hexitan and hexide derivatives hereof may be added to the hydrophilic colloid light-sensitive emulsions over a wide range of proportions. Suitable amounts include from 0.01 to 2.0 parts of the compound per 100 parts by weight of the wet emulsion. When used in the light-insensitive layers, the proportions in general should be higher than just specified. For example, a preferable range is 0.05 to 1.5 parts of compound per 100 parts of coating solution.

The photographic emulsions may contain any

| Name of compound | Quantity | Age of film | Relative speed | Gamma | Fog |
|---|---|---|---|---|---|
| | *Ml.* | | | | |
| Control | | Fresh | 400 | 0.83 | 0.05 |
| Do | | 1 week | 400 | .84 | .04 |
| Do | | 1 week @ 120° F. | 230 | .67 | .25 |
| Sorbitan monostearate polyoxyalkylene ether | 0.1 | Fresh | 460 | .85 | .04 |
| Containing 20 oxyalkylene groups in 3 chains | .1 | 1 week | 373 | .82 | .08 |
| Do | .1 | 1 week @ 120° F. | 348 | .72 | .19 |
| Sorbitan monooleate polyoxyalkylene ether | .2 | Fresh | 429 | .85 | .08 |
| Containing 20 oxyalkylene groups in 3 chains | .2 | 1 week | 429 | .84 | .08 |
| Do | .2 | 1 week @ 120° F. | 283 | .66 | .42 |

In the above examples the quantity of oxyethylene groups is approximate. The invention, however, is not limited to the specific polyoxyalkylene ether derivatives described in the examples but, on the contrary, any of such derivatives having the characteristics prescribed above may be substituted in like manner. Thus mannitan mono-, di-, and tri-oleates, -stearates, -palmitates, -margarates, etc., containing from 2 to 20 oxyalkylene groups which are distributed in from 1 to 3 chains are useful. Similarly the corresponding mannides containing one of said fatty acid groups and a similar amount of oxyalkylene groups per molecule. Other suitable compounds including the mannide ether esters, e. g., the palmitates, margarates, stearates, oleates, which contain from 2 to 20 oxyalkylene groups and especially oxyethylene groups

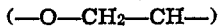

(—O—CH$_2$—CH—)

which are distributed in from 1 to 3 chains. Mannitan, mannide, sorbitan and sorbide, decyl, dodecyl, tetradecyl, hexadecyl and octadecyl ethers containing the same number of oxyalkylene, especially oxyethylene groups are also useful. The compounds are useful in simple and mixed silver halide emulsions of various types including those containing silver chloride only and those containing one or more other light-sensitive silver halides, e. g., silver bromide and silver iodide.

The invention is not limited to the use of gelatin as the binding agent for the silver halides. On the contrary, other hydrophilic colloids such as agar-agar, polyglycuronic acids, zein, collodian, water-soluble cellulose derivatives such as substantially hydrolyzed cellulose acetate, cellulose esters of hydroxy monocarboxylic acids, e. g., lactic or glycolic acids, alkali metal salts of cellulose esters of dicarboxylic acids such as phthalic of the usual sensitizing compounds such as the so-called sulphur sensitizers, e. g., allylthioureas, thiocyanates, sodium thiosulfate, sodium hyposulfite, etc. In addition various types of optical sensitizing dyes which modify the spectral characteristics of silver halide emulsions can be used in conjunction with the above agents. Suitable sensitizing dyes are described in United States Patents 2,010,388, 2,079,376, 2,202,990, 2,202,991, 2,202,992, 2,278,461, 2,265,908, etc.

The hexitan derivatives used in accordance with this invention alter the induction period of development and result in increased density of the developed silver images. The theory of the effect of these compounds on silver halide emulsions is not completely understood but the results obtainable indicate that the emulsion is sensitized to the reducing action of the developers. In comparison with other known methods for increasing the light-sensitivity of photographic silver halide emulsions, e. g., by the addition of sulfur-containing bodies and cyanine dyes for increasing the spectral absorption, the present compounds appear to sensitize the emulsions to the development action. Latent images which were not previously developable are made developable by these agents, however, the inherent sensitivity of the emulsions do not appear to be changed. The novel polyoxyalkylene ethers hereof when used in photographic silver halide emulsions free from hydrotropic agents such as saponin, etc. while of some utility present coating difficulties. They give rise to coating streaks and mottle in the emulsion layer. When the polyoxyalkylene ethers are used in conjunction with hydrotropic agents these difficulties are overcome and an enhanced development sensitivity is obtained. In addition they admit of the use of substantially increased amounts of wetting agents such as saponin and alcohol in emulsions at the time of coating. In fact a 500% increase in the amount of alcohol in the solution can be used.

In place of the saponin of the above examples, there may be substituted various other hydrotropic agents. Suitable additional ones include alkali metal salts of alkylated naphthalene sulfonic acids, alkali metal salts of long chain alkyl sulfates and alkyl sulfonates. Still other hydrotropic agents are described in Ullman Encyclopaedie der Technischen Chemie, 2nd edition, vol. IX, page 808. The agents may be used over a fairly wide range. For example, they may be used in the water-permeable layers both of the light-sensitive and light-insensitive type in an amount from 0.05 to 1% or more, based on the solids in solution.

As many widely different embodiments of the invention may be made without departing from the spirit and scope thereof, it is to be understood that we do not limit ourselves to the specific embodiments hereof except as described in the following claims.

It is claimed:

1. A photographic element comprising a support bearing a light-sensitive silver halide layer having a hydrotropic agent in contact therewith, and a layer containing a polyoxyalkylene ether of a ring-dehydration product of a hexitol in contact with said silver halide layer.

2. A photographic element comprising a support, a light-sensitive silver halide layer containing a hydrotropic agent, said layer having in contact therewith a small amount of a polyoxyalkylene ether of a ring-dehydration product of a hexitol.

3. A photographic element comprising a support, a light-sensitive silver halide layer containing a hydrotropic agent, said layer having in intimate contact therewith a polyoxyalkylene ether of a ring-dehydration product of a hexitol having at least one lipophilic radical X attached to an acyclic oxygen atom thereof where X is a monovalent radical taken from the group consisting of R— and RCO— where R is an aliphatic hydrocarbon radical of 8 to 20 carbon atoms.

4. A photographic element comprising a support, a light-sensitive silver halide layer containing a hydrotropic agent, said layer having in contact therewith a small amount of a polyoxyalkylene ether of a hexitan.

5. A photographic element comprising a support, a light-sensitive silver halide layer containing a hydrotropic agent, said layer having in contact therewith a small amount of a polyoxyalkylene ether of a hexide.

6. A photographic element comprising a support, a light-sensitive silver halide layer containing saponin, said layer having in intimate contact therewith a polyoxyalkylene ether of a ring-dehydration product of a hexitol having at least one lipophilic radical X attached to an acyclic oxygen atom thereof where X is a monovalent radical taken from the group consisting of R— and RCO— where R is an aliphatic hydrocarbon radical of 8 to 20 carbon atoms.

7. A photographic element comprising a support, a light-sensitive silver halide layer containing saponin, said layer having in intimate contact therewith a polyoxyalkylene ether of a hexitan having a lipophilic radical X attached to an acyclic oxygen atom thereof where X is a monovalent radical taken from the group consisting of R— and RCO— where R is an aliphatic hydrocarbon radical of 8 to 20 carbon atoms.

8. A photographic element comprising a support, a light-sensitive silver halide layer containing saponin, said layer having in intimate contact therewith a polyoxyalkylene ether of a hexide having a lipophilic radical X attached to an acyclic oxygen atom thereof where X is a monovalent radical taken from the group consisting of R— and RCO— where R is an aliphatic hydrocarbon radical of 8 to 20 carbon atoms.

9. A photographic element comprising a transparent film base bearing a water-permeable colloid-silver halide layer containing saponin and a water-permeable colloid layer in contact therewith containing a small amount of a polyoxyalkylene ether of a hexitan mono-fatty acid ester of 8 to 20 carbon atoms.

10. A photographic element comprising a transparent film base bearing a water-permeable colloid-silver halide layer containing saponin and a water-permeable colloid layer in contact therewith containing a small amount of polyoxyalkylene ether of a hexide mono-fatty acid ester of 8 to 20 carbon atoms.

11. A photographic element comprising a support bearing a light-sensitive silver halide emulsion layer containing a hydrotropic agent and a small amount of a polyoxyalkylene ether of mannitan monolaurate.

12. A photographic element comprising a support bearing a light-sensitive silver halide emulsion layer containing a hydrotropic agent and a small amount of a polyoxyalkylene ether of mannitan monolaurate containing 20 oxyalkylene groups divided in 3 chains.

13. A photographic element comprising a support bearing a light-sensitive silver halide emulsion layer containing a hydrotropic agent and a small amount of a polyoxyalkylene ether of sorbitan monolaurate.

14. A photographic element comprising a support bearing a light-sensitive silver halide emulsion layer containing a hydrotropic agent and a small amount of a polyoxyalkylene ether of sorbitan monolaurate containing 20 oxyalkylene groups divided in 3 chains.

RALPH KINGSLEY BLAKE.
WALTER DEWEY BALDSIEFEN.

Certificate of Correction

Patent No. 2,400,532.  May 21, 1946.

RALPH KINGSLEY BLAKE ET AL.

It is hereby certified that errors appear in the printed specification of the above numbered patent requiring corrections as follows: Page 1, first column, line 23, for "including" read *include*; page 3, first column, line 55, for "(—O—CH$_2$—CH—)" read (—O—CH$_2$—CH$_2$—); page 4, second column, line 35, claim 10, after the words "amount of" insert the article *a*; and that the said Letters Patent should be read with these corrections therein that the same may conform to the record of the case in the Patent Office.

Signed and sealed this 3rd day of December, A. D. 1946.

[SEAL]

LESLIE FRAZER,
*First Assistant Commissioner of Patents.*